United States Patent [19]

Suga

[11] Patent Number: 4,914,518

[45] Date of Patent: Apr. 3, 1990

[54] ELECTRONIC STILL CAMERA WITH A SOLID STATE IMAGE PICKUP WHOSE OUTPUT PART IS KEPT FROM BEING DRIVEN DURING A MAJOR PART OF THE IMAGE PICKUP PERIOD

[75] Inventor: Akira Suga, Tokyo, Japan

[73] Assignee: Canon Kabushiki Kaisha, Tokyo, Japan

[21] Appl. No.: 366,258

[22] Filed: Jun. 12, 1989

Related U.S. Application Data

[63] Continuation of Ser. No. 144,242, Jan. 14, 1988, abandoned.

[30] Foreign Application Priority Data

Jan. 19, 1987 [JP] Japan ............................. 62-008073

[51] Int. Cl.4 ............................................. H04N 3/14
[52] U.S. Cl. ........................... 358/213.15; 358/213.16; 358/213.19
[58] Field of Search ...................... 358/213.19, 213.31, 358/213.26, 213.16, 213.15, 167

[56] References Cited

U.S. PATENT DOCUMENTS

| | | | |
|---|---|---|---|
| 4,430,672 | 2/1984 | Berger | 358/213.19 |
| 4,589,025 | 5/1986 | Monahan et al. | 358/213.16 |
| 4,611,234 | 9/1986 | Berger et al. | 358/213.15 |
| 4,682,232 | 7/1987 | Takayama et al. | 358/172 |
| 4,698,686 | 10/1987 | Endo et al. | 358/213.26 |
| 4,742,395 | 5/1988 | Nagai et al. | 358/213.19 |

Primary Examiner—Jin F. Ng
Assistant Examiner—Stephen Brinich
Attorney, Agent, or Firm—Robin, Blecker, Daley & Driscoll

[57] ABSTRACT

An electronic still camera comprises a solid state image pickup element including photosensitive elements, a vertical transfer CCD and a horizontal transfer CCD, and a read drive circuit for the solid state image pickup element. Before the start of reading the signal from the solid state image pickup element, at least one pulse is applied to the horizontal transfer CCD to remove electric charges of the interior of the CCD to nullify dark current. The above-described pulse applied to the horizontal transfer CCD before the start of reading the signal from the solid state image pickup element lies in an image pickup period, and the frequency of the above-described pulse of this time is less than the frequency in the read period.

28 Claims, 12 Drawing Sheets

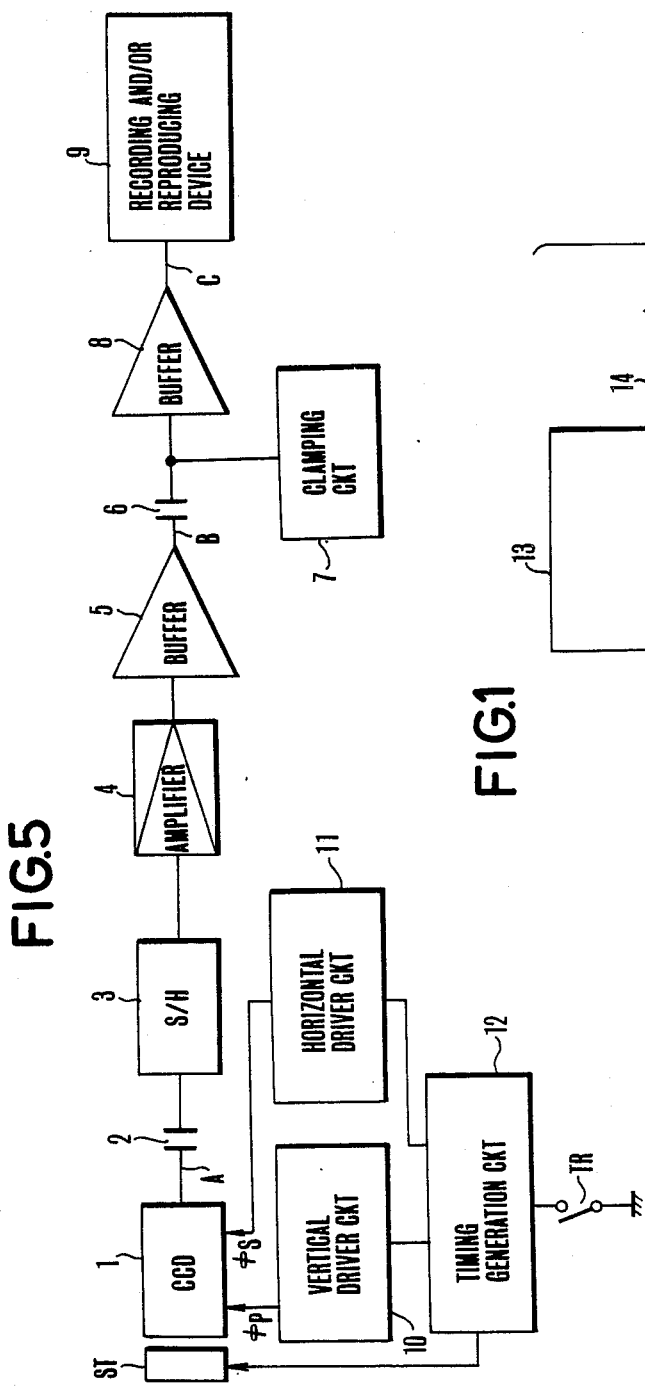
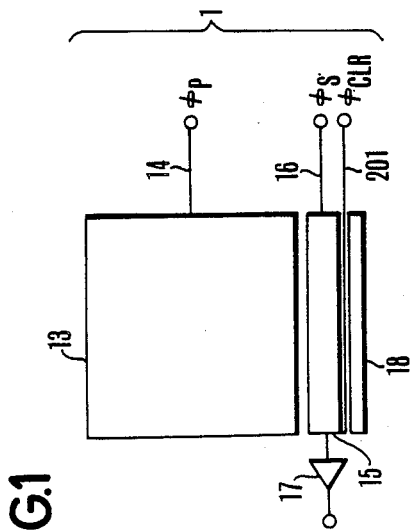

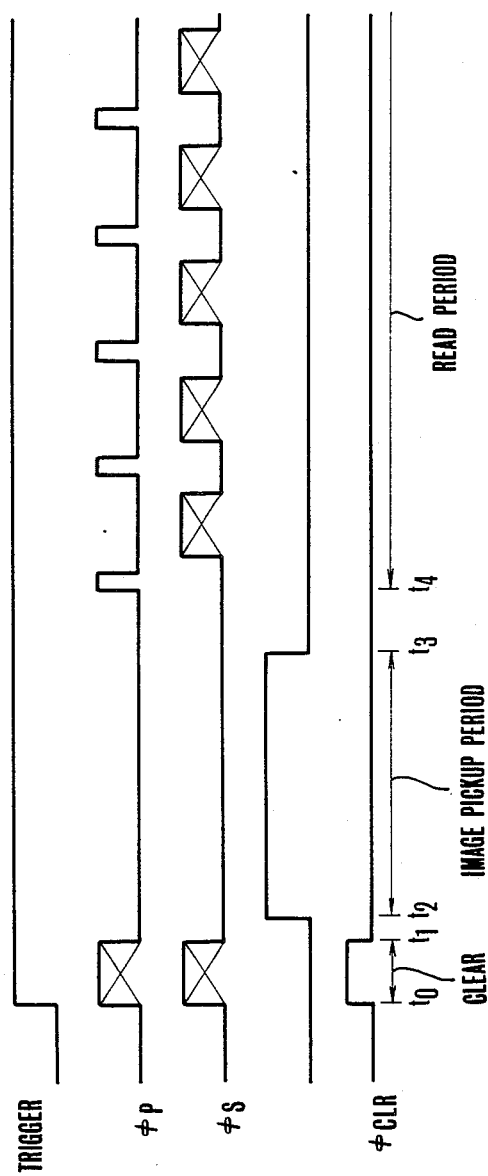

ELECTRONIC STILL CAMERA WITH A SOLID STATE IMAGE PICKUP WHOSE OUTPUT PART IS KEPT FROM BEING DRIVEN DURING A MAJOR PART OF THE IMAGE PICKUP PERIOD

This application is a continuation of application Ser. No. 144,242, filed Jan. 14, 1988, now abandoned.

BACKGROUND OF THE INVENTION:

1. Field of the Invention:

This invention relates to electronic still cameras having a solid state image pickup element comprised of photosensitive elements, a vertical transfer CCD and a horizontal transfer CCD and a read drive circuit for the solid state image pickup element.

2. Description of the Related Art:

FIG. 1 is a diagram illustrating the outline of the structure of the image pickup element suited to the electronic still camera in the prior art and this invention.

In the figure, 1 is a full-frame transfer type CCD having photosensitive cells arrayed in the matrix form and also serving as a plurality of vertical transfer CCDs. Incident light impinging on a light receiving part 13 of the CCD 1 is converted to electric charge in the photosensitive cell and accumulated. When a vertical transfer pulse $\phi_P$ for vertically transferring the electric charge of the CCD is applied to the electrode 14, the accumulated electric charge is transferred to the horizontal transfer CCD 15 by one row, and further when a horizontal transfer pulse $\phi_S$ is applied to a horizontal transfer electrode 16, the electric charge transferred to the horizontal transfer CCD 15 is transferred horizontally, and converted to a voltage by an output amplifier 17. Also, 18 is a clear drain for draining out the unnecessary electric charge, and provided adjacent the CCD 15 through a gate. Also, 201 is a clear gate for controlling the potential barrier of the above-described gate between the horizontal CCD 15 and the clear drain 18. The pulse to be applied to this clear gate 201 is $\phi_{CLR}$.

FIG. 2 is a diagram of the details of the output amplifier 17 for converting the electric charge of the CCD 1 to the voltage. 16a is a transfer gate; 20 is a MOS transistor; 21 is a reset drain; $V_{DD}$ is the drain voltage of the MOS transistor 20; FD is a floating diffusion (FD) layer; $C_{FD}$ is the coupling capacitance of this FD and the MOS transistor 20.

In FIG. 2, in the normal reading operation, letting the electric charge injected into the FD be denoted by $\Delta Q$, the detection signal $\Delta V$ at the gate of the amplifier comprising the MOS transistor 20 becomes $$\Delta V = \Delta Q / C_{FD}$$

Here, when the horizontal transfer pulse $\phi_S$ is applied to a reset gate which is one of the transfer gates 16a, the electric charge $\Delta Q$ is discharged to the reset drain 21, so that the FD is reset to the drain voltage $V_{DD}$, and then the next electric charge is injected.

FIG. 3 is a timing chart of driving of the CCD 1 for the conventional electronic still camera.

In FIG. 3, the electronic camera has all electrical power sources applied in a state that the trigger output is high (H). A space from a time $t_0$ to $t_1$ is a clear period, where a high (H) voltage is applied to the clear gate 201, the potential barrier between horizontal transfer CCD 15 and the clear drain 18 is lowered, and the electric charges accumulated on the light receiving part 13 and the horizontal transfer CCD 15 are discharged to the clear drain 18. During an interval from a time $t_2$ to $t_3$, the shutter opens, and electric charge is accumulated on the light receiving part 13. After a time $t_4$, a read period follows where the accumulated electric charge is vertically transferred by a vertical transfer pulse $\phi_P$, and horizontally transferred by a horizontal transfer pulse $\phi_S$, being read out at a high speed. For note, the clear gate 201 is made low (L) voltage so that the potential barrier between the horizontal CCD 15 and the clear drain 18 is heightened. The output wave forms of this time are shown in FIG. 4. For note, A, B, C are respectively the output wave forms of the image pickup element output, before the clamping and after the clamping.

As shown in FIG. 4, in the output wave form A, because, after the clear, the horizontal transfer pulse $\phi_S$ does not enter, the voltage gradually lowers.

This is, if with such a horizontal transfer pulse $\phi_S$ as in FIG. 3, no horizontal transfer pulse $\phi_S$ is not applied after the clear until the read start, so that the FD of FIG. 2 is not reset to the drain voltage $V_{DD}$, and the electric charge is discharged from the $C_{FD}$ with gradual decrease of the output voltage. Therefore, like as the output wave form B of FIG. 4, the change of the potential of the time of a read start becomes so large that even if clamping is applied to the image pickup element output, the response of the clamping circuit cannot follow up. Like the output wave form C of FIG. 4, it takes a long time until the potential becomes constant. Also, the dark current collected in the horizontal transfer CCD 15 also is not reset. Therefore, there was an occasion that that dark current was outputted.

SUMMARY OF THE INVENTION:

This invention has been made to solve such conventional problems, and its object is to provide an electronic still camera in which the response of the read drive circuit can operate swiftly, so that the potential becomes constant in a short time, and the collection of the dark current is removed.

To achieve the above-described object, in embodiments of this invention, in the image pickup element made to perform the reading operation during accumulation, there is provided means for making the output potential of the read drive circuit of the horizontal transfer CCD to be the reference potential at least once before the read start.

By having provided the above-described means, there is no change of the potential of the horizontal transfer CCD, dark current does not collect, and the response of the read drive circuit can operate swiftly.

Other objects and features of the present invention will become apparent from the following detailed description of the preferred embodiments thereof and drawings.

BRIEF DESCRIPTION OF THE DRAWINGS:

FIG. 1 is a diagram illustrating the concrete structure of the CCD.

FIG. 3 is a timing chart of driving of the CCD for the conventional electronic still camera.

FIG. 5 is a diagram illustrating the outline of the main parts of an electronic still camera in the present invention.

Figure 2:
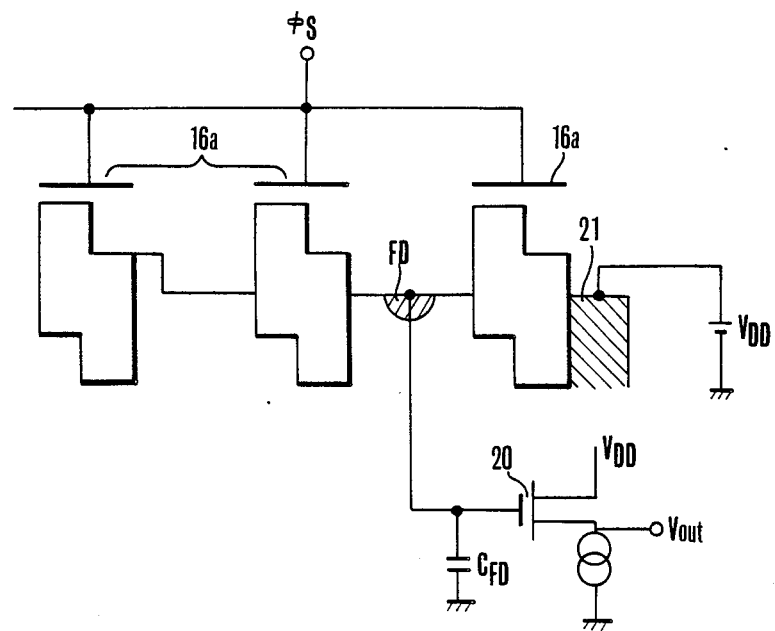
FIG. 2 is a diagram of the details of an output amplifier for the CCD.

DETAILED DESCRIPTION OF THE PREFERRED EMBODIMENTS:

FIG. 5 is a diagram illustrating an example of the structure of an electronic still camera of an embodiment of the present invention. In FIG. 5, 1 is a solid state image pickup element or CCD for converting photo-signals to an electrical image signal. The output signal of this CCD 1 is applied through a coupling capacitor 2 to a sample-hold circuit 3 in which the clock lead noise of the output of the CCD 1 is removed. By an amplifier 4, a prescribed gain is set in. In a buffer 5, the impedance is altered so as to improve the clamping characteristic. The potential of the signal during the horizontal blanking is fixed to a prescribed level by a clamping circuit 7 through a capacitor 6 for A.C. coupling. By another buffer 8, the impedance is altered so as to improve the clamping capability. Its output is applied as the output signal to a recording and/or reproducing device 9.

Also, the CCD 1 is driven by a vertical transfer pulse $\phi_P$ and a horizontal transfer pulse $\phi_S$ made up by a timing generation circuit 12 and passed through a vertical drive circuit 10 and a horizontal driver circuit 11 respectively.

Also, ST is a shutter for optionally exposing the CCD 1, and TR is a trigger button for indicating image pickup and recording.

Figure 6:
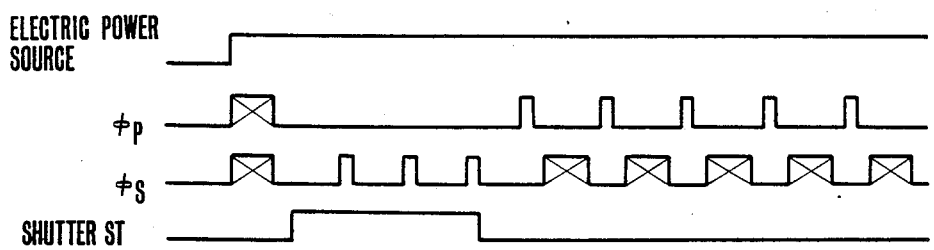
FIG. 6 is a timing chart of driving of a CCD for the electronic still camera in a first embodiment of this invention.

FIG. 6 is a timing chart by a drive circuit 10-12 for driving the CCD in a first embodiment of the present invention.

In FIG. 6, by driving the horizontal transfer pulse $\phi_S$ even in the interval from the clear to the read start, the dark current in FIG. 2 is drained out to the reset drain 21, and further the FD is reset to the drain voltage VDD. Therefore, lowering of the output voltage can be suppressed.

Figure 4:
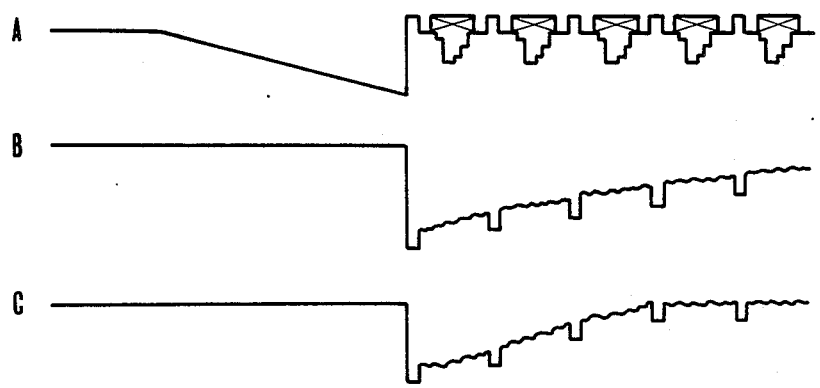
FIG. 4 is waveforms of the output of the CCD when driven in the conventional timings.
Figure 7:
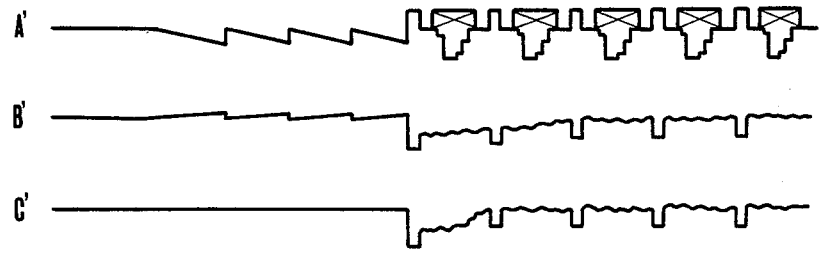
FIG. 7 is waveforms of the output of the CCD when driven in timings of this invention.

FIG. 7 is output wave forms at the time of driving the CCD 1 of FIG. 1 in the timing of FIG. 6. As shown in FIG. 7, the CCD 1 is reset like the output waveform A' each time the horizontal transfer pulse $\phi_S$ is applied thereto. Therefore, in the figure, the fall of the voltage becomes small compared with the conventional case of FIG. 4. For this reason, the output waveforms B' and C' return to the constant potential in an earlier time than in FIG. 4.

Figure 8:
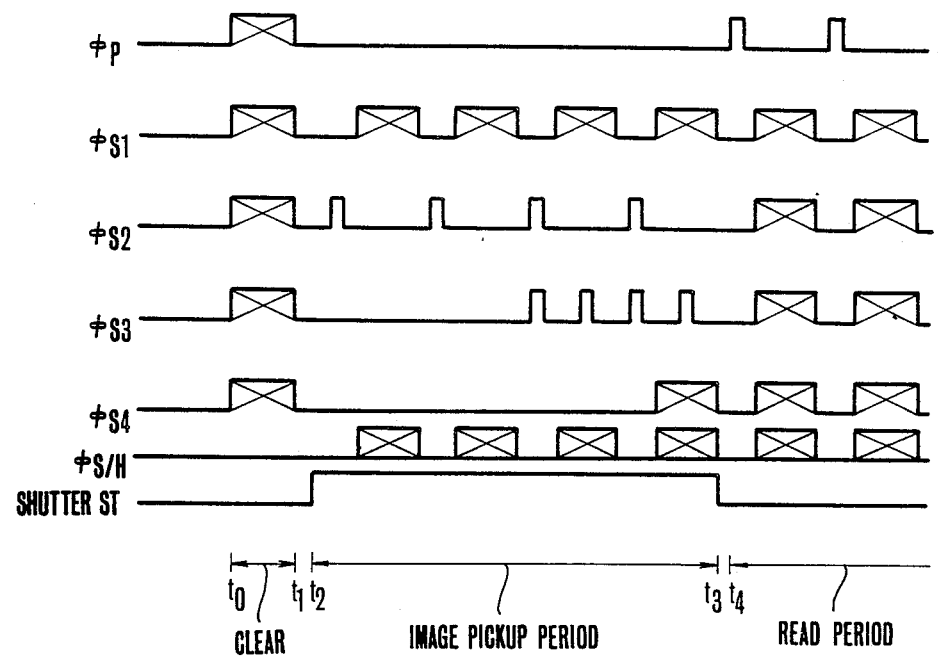
FIG. 8 is diagrams illustrating second to fifth embodiments of the horizontal transfer pulse in this invention.

FIG. 8 shows second to fifth embodiments of the horizontal transfer pulse $\phi_S$ in this invention. For example, the horizontal transfer pulse $\phi_{S1}$ is the embodiment of applying a pulse similar to that of the read period even when in the image pickup period so that as has been described above, the effect that the FD is reset to the drain voltage is obtained. But there is the following drawback. That is, letting the frequency of the horizontal transfer pulse $\phi_S$ be denoted by f, the amplitude of the voltage by v, the capacitance of the horizontal transfer electrode 16 by c, the consumption electric power P is expressed by:

$$P = fcv^2$$

Therefore, in the case when the frequency f is large as the pulse $\phi_{S1}$, the consumption electric power becomes large. To compensate for such a drawback, it may be considered to apply a pulse of a small frequency like a pulse $\phi_{S2}$ intermittently as the third embodiment. Also, like pulses $\phi_{S3}$ and $\phi_{S4}$ of fourth and fifth embodiments, the pulse may be applied only in the latter half of the image pickup period intermittently or continuously respectively. But in the example of a pulse $\phi_{S4}$, similarly to the case of the pulse $\phi_{S1}$, there is a drawback that the consumption electric power somewhat increases.

Yet, in these four examples, though there are differences in the consumption electric power of the horizontal transfer CCD 15, they are the same in the point that it is possible to remove the dark current of the interior of the horizontal transfer CCD 15 and to minimize the variation of the potential of the output of the CCD 1.

Figure 9:
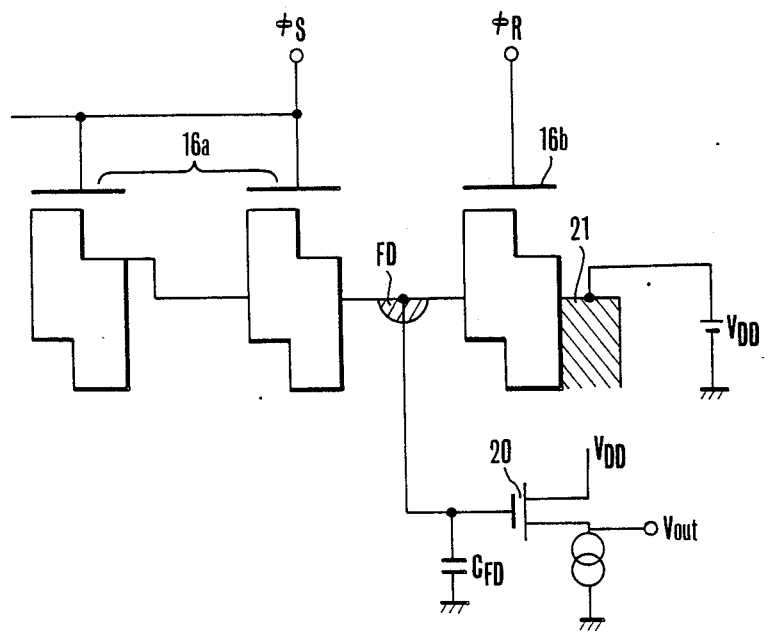
FIG. 9 is a diagram illustrating the structure of the output stage of the CCD used as a sixth embodiment of the invention.

FIG. 9 is a diagram illustrating an example of the structure of the output part of the image pickup element CCD 1 as the sixth embodiment of this invention. 16b is a reset gate of the horizontal transfer electrode 16. That the horizontal transfer gate 16a and the reset gate 16b are independent is different from that of FIG. 2. The reset gate pulse for the reset gate 16b is represented by $\phi_R$.

Figure 10:
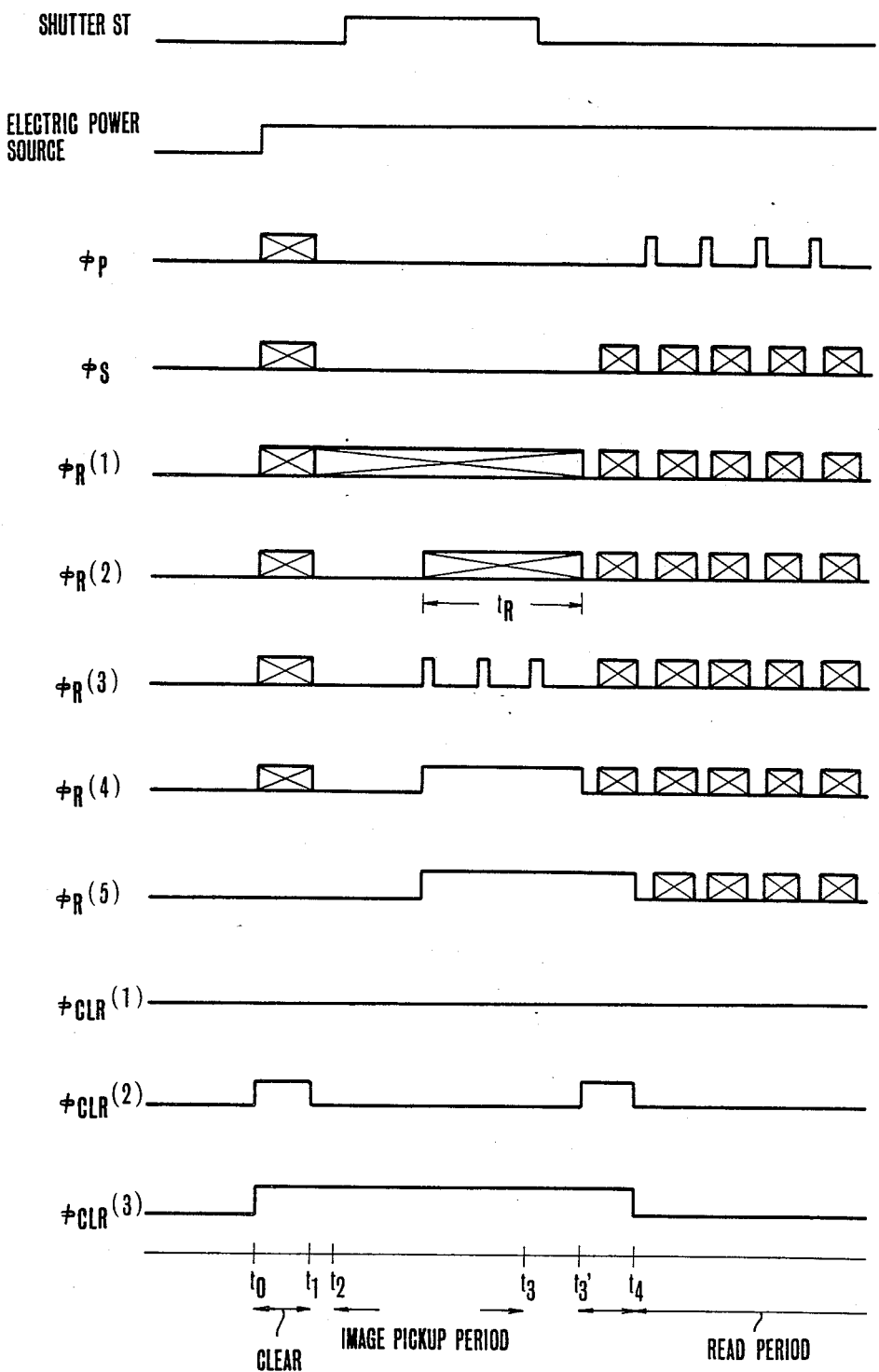
FIG. 10 is waveforms of seventh to fourteenth embodiments of pulses illustrating a drive method for the embodiment of the invention of FIG. 9.

FIG. 10 is pulse waveform diagrams of seventh to fourteenth embodiments illustrating the method of driving the arrangement of the sixth embodiment shown in FIG. 9.

When the reset pulse $\phi_R$ is $\phi_{R(1)} - \phi_{R(4)}$ of the seventh to tenth embodiments, the clear gate pulse $\phi_{CLR}$ shown in FIG. 1 is made either to remain low (L) (the barrier is high) as shown by the solid line, or to be applicable to the image pickup element without the clear gate 201 and the clear drain 18.

When the trigger button TR is turned on, an electric power source turns on in a period from a time $t_0$ to $t_1$, and the unnecessary electric charge in the CCD 1 is soon removed. During this time, what is different from the foregoing embodiments is that the unnecessary electric charge is not dumped to the clear drain 18, but transferred horizontally in the interior of the horizontal transfer CCD 15 and then dumped. In the image pickup period of times $t_2-t_3$, the horizontal transfer CCD 15 is not driven, but the reset gate 16b only is driven. This reset gate 16b is very small in capacitance compared with the transfer gate 16a. Therefore, compared with the case of driving the transfer gate 16a too, the consumption electric power can be largely reduced. In FIG. 10, the pulse $\phi_{R(1)}$ of the seventh embodiment is almost continuously clocking the pulse $\phi_R$ after the electric power source has turned on until the read is started at a time point $t_4$. The pulse $\phi_{R(2)}$ of the eighth embodiment does clocking only the reset gate 16b earlier than the follow-up time (this time is represented by $t_R$) of the clamping circuit 7 before the read start. The pulse $\phi_{R(3)}$ of the ninth embodiment also drives the reset gate pulse $\phi_R$ only in the follow-up time $T_R$ period of the clamping circuit 7, but the frequency is made smaller than when in the normal reading. By clocking intermittently, the consumption electric power is minimized. Next, in the pulse $\phi_{R(4)}$ of the tenth embodiment, during the period of the above-described follow-up time $t_R$, the reset gate pulse $\phi_R$ is made high (H) to stabilize the output potential of the CCD 1. Further, the seventh to fourteenth embodiments differ from the embodiment of FIG. 6 in that the interval of times $t'_3$-$t_4$ is provided with a clear period of the horizontal transfer CCD 15. That is, during the image pickup period, in order to dump the dark current collected in the horizontal transfer CCD 15 just before the read period, more horizontal transfer pulses $\phi_S$ than the number of transfer stages of the horizontal transfer CCD 15 are applied. At this time, even to pulses $\phi_{R(1)\text{-}R(4)}$, the reset gate pulse $\phi_R$ also is applied in synchronism with the horizontal transfer pulse $\phi_S$. Next, in the case of the CCD 1 equipped with the clear gate 201 and the clear drain 18, the reset gate pulse $\phi_R$ is made up like the pulse $\phi_{R(5)}$ of the eleventh embodiment. In this case, the clear gate pulse $\phi_{CLR}$ may be made like the pulse $\phi_{CLR(2)\text{ or }CLR(3)}$ of the thirteenth or fourteenth embodiment. In this case, the unnecessary electric charge in the interior of the horizontal transfer CCD 15 is dumped into the clear drain 18.

The embodiment shown in FIG. 10 is that as this explanation, for output potential stabilization, the electrode 16a is not moved, and only the reset gate 16b is driven during the period $t_1$-$t_3'$. Therefore, the consumption electric power can be lessened. Also, by placing the clear period of the horizontal transfer CCD 15 (in $t_3'$-$t_4$) just before the read period, the dark current of the horizontal transfer CCD 15 can be cleared before the read.

Figure 11:
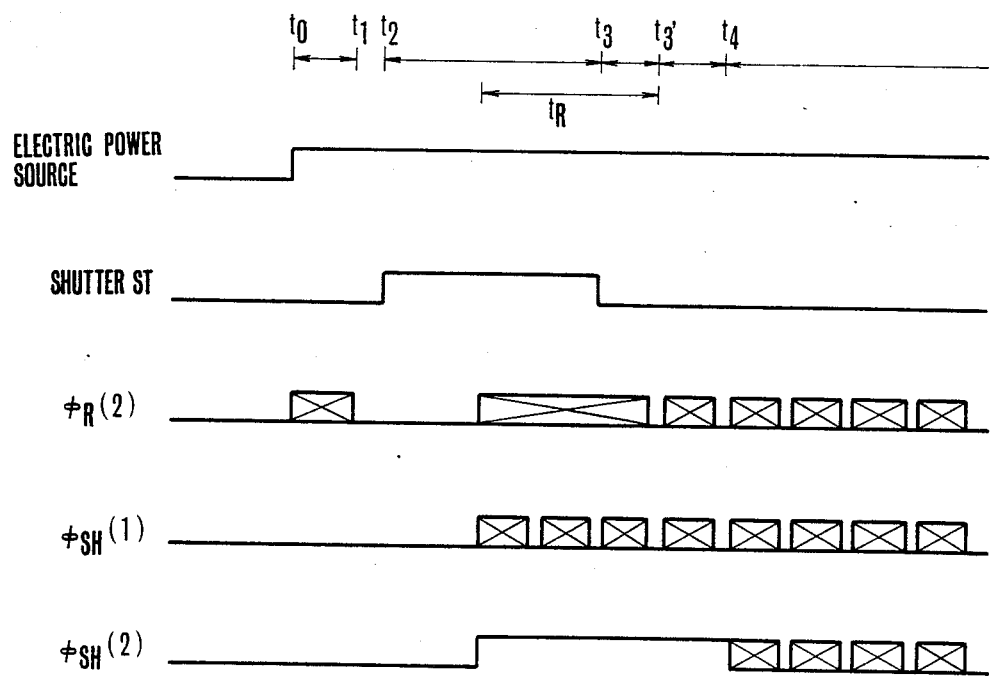
FIG. 11 is a diagram for explaining fifteenth and sixteenth embodiments of sample-hold pulses to be given to the sample-hold circuit of FIG. 5.

FIG. 11 is a diagram for explaining about the sample-hold pulse $\phi_{SH}$ to be given to the sample-hold circuit 3 of FIG. 5. In this embodiment, the sample-hold pulse $\phi_{SH}$, similar to the pulse $\phi_{SH(1)}$ of the fifteenth embodiment, is given earlier by more than the time $t_R$ to the sample-hold circuit 3 than the read start time $t_4$. Therefore, the output potential of the CCD 1 is transmitted to the clamping circuit 7 so that the effect of stabilizing the output potential of the CCD 1 goes out more prominently. To give a similar effect, the sample-hold pulse $\phi_{SH}$ may be made the high (H) state from earlier than the read start by the time $t_R$ to just before the read start, similar to the pulse $\phi_{SH(2)}$ of the sixteenth embodiment.

Figure 12:
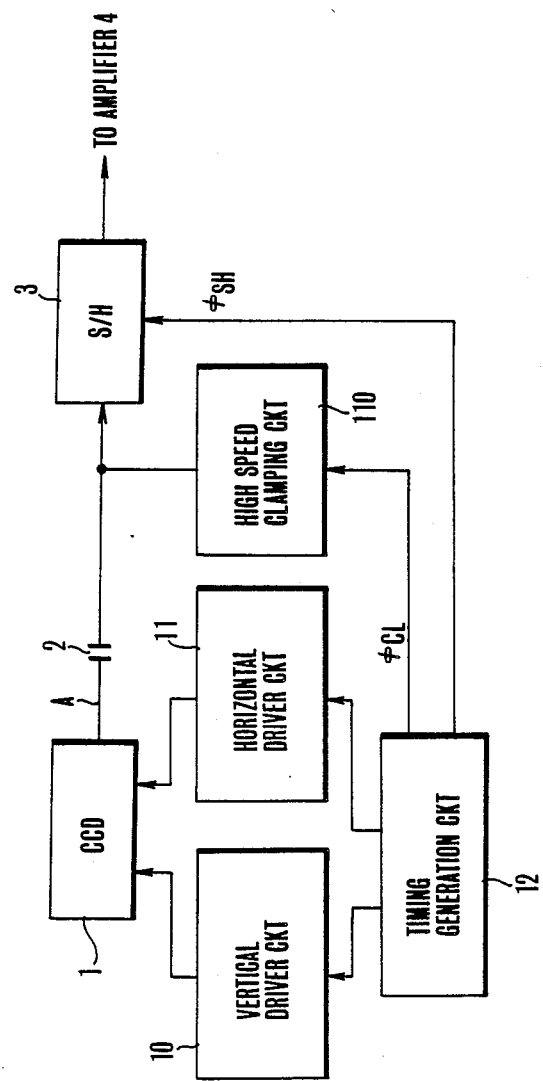
FIG. 12 is a block diagram of a seventeenth embodiment of the invention in which a CDS circuit is used to remove random noise of the CCD.

FIG. 12 is a block diagram of the seventeenth embodiment of this invention in which a Correlated Double Sampling (CDS) circuit is used to remove the random noise of the CCD 1. 110 is a high speed clamping circuit. The output of the CCD 1 is coupled in the capacitor 2, and this output is clamped to a prescribed potential. For this purpose, the high speed clamping circuit 110 is operated by a clamp pulse $\phi_{CL}$ to clamp the potential of the output of the CCD 1.

Figure 13:
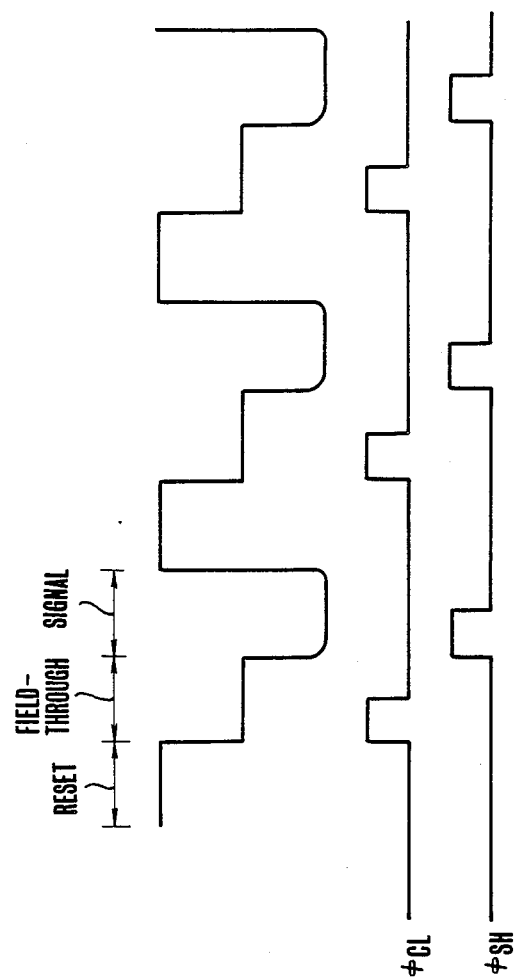
FIG. 13 is a diagram illustrating the typical waveform of the output of the CCD and the phases of clamp pulses and sample-hold pulses for performing an operation of the CDS circuit.

FIG. 13 is a diagram illustrating the typical waveform of the output of the CCD 1 and the phases of the clamp pulse $\phi_{CL}$ and the sample-hold pulse $\phi_{SH}$ for performing the operation of the CDS circuit. In the circuit of FIG. 12, if the clamping and sampling-holding are carried out in the timing shown in FIG. 13, a signal clamped to a prescribed potential is obtained.

Figure 14:
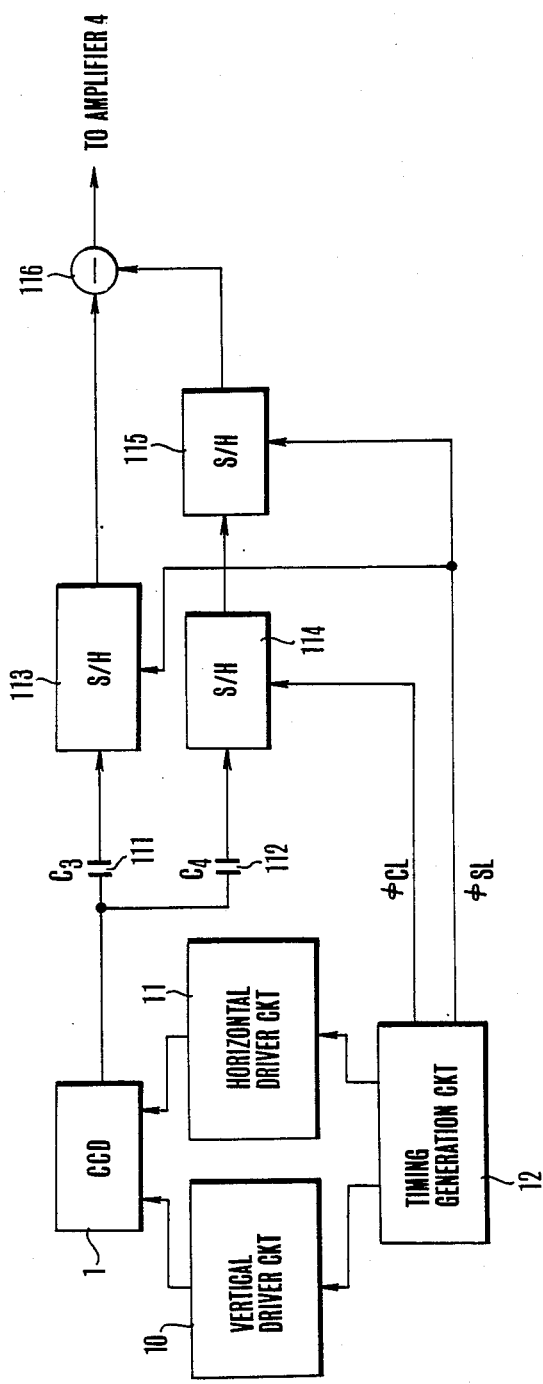
FIG. 14 is a diagram of a CDS circuit as an eighteenth embodiment.

FIG. 14 is a diagram illustrating an example of the CDS circuit as the eighteenth embodiment of this invention, having coupling capacitors 111 and 112, a first sample-hold (S/H) circuit 113, a second S/H circuit 114, a third S/H circuit 115 and a differential circuit 116.

In the circuit of FIG. 14, in the second S/H circuit 114, the field-through level of the CCD 1 is sampled and held in the timing of the clamp pulse $\phi_{CL}$. In the third S/H circuit 115, the field-through level is again sampled and held in the phase of the sample-hold pulse $\phi_{SH}$. In the differential circuit 116, the field-through level is subtracted from the signal level. In such a manner, the CDS operation is performed.

Figure 15:
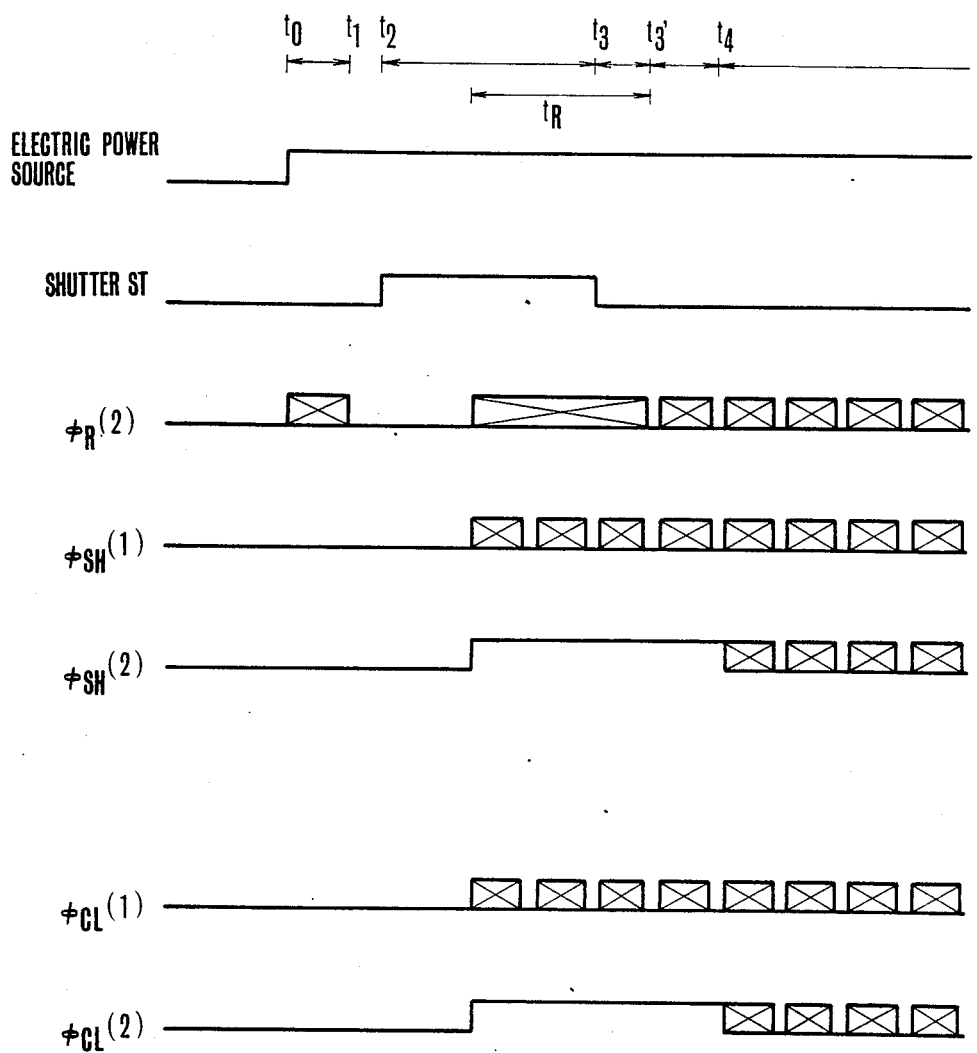
FIG. 15 is a diagram illustrating a drive method of a nineteenth embodiment in which the CDS circuit is used.

In the case when the CDS circuit of these seventeenth and eighteenth embodiments is used, a drive method as the nineteenth embodiment shown in FIG. 15 is carried out.

That is, from earlier than the read by the time $t_R$, the clamp pulse $\phi_{CL}$ starts to be driven as the pulse $\phi_{CL(1)}$. But, in such a circuit as shown in FIG. 14, as the pulse $\phi_{CL(2)}$, from earlier than the read period by the time $t_R$ until just before the read start, the clamp pulse $\phi_{CL}$ may be made H. By this feature, even in the arrangement of the seventeenth and eighteenth embodiments having the CDS circuit, the stabilized potential of the CCD 1 can be transmitted to the rear stage.

As has been described above, this invention has advantages that in the apparatus in which as in the electronic still camera, during the electric charge accumulation, the reading of the CCD drive circuit is carried out, that the dark current collected in the horizontal CCD can be removed by supplying the transfer pulse before starting the reading, so that the influence of the dark current is removed from the output wave form, and by minimizing the variation of the potential of the CCD output, the time the response of the clamping circuit takes to become a constant potential can be shortened.

What is claimed is:

1. An image pickup apparatus comprising:
   (a) image pickup means having a light receiving part for converting an optical image to an electrical signal and an output part for producing an output signal of the light receiving part;
   (b) read means for reading the output signal of said image pickup means after a predetermined time period after clearing the electrical signal of said image pickup means, said read means being so arranged that it does not drive said output part in a major part of said predetermined period; and
   removing means for removing a residual signal in said output part of said predetermined time period just before the reading by said read means.

2. An apparatus according to claim 1, wherein said output part includes an output amplifier for converting an electric charge signal formed by the light receiving part to a voltage signal.

3. An apparatus according to claim 1, wherein said output part includes a CCD transfer part.

4. An apparatus according to claim 1, further comprising clamping means connected to said output part for clamping the signal from the output part.

5. An apparatus according to claim 4, wherein said output part includes a CDS circuit.

6. An apparatus according to claim 1, wherein said removing means performs removing intermittently.

7. An apparatus according to claim 1, wherein said removing means performs removing continuously.

8. An apparatus according to claim 2, wherein said output part includes resetting means for resetting the voltage signal in the interior of said output amplifier.

9. An apparatus according to claim 8, wherein said removing means performs removing by operating said resetting means.

10. An apparatus according to claim 1, wherein said image pickup means has a drain adjacent to the output part through a gate.

11. An apparatus according to claim 10, wherein said removing means performs removing by controlling said gate.

12. An electronic still camera comprising a solid stage image pickup element including photosensitive elements and a horizontal transfer CCD and a read drive circuit for said solid state image pickup element for accumulating an electrical signal in said image pickup element in a predetermined image pickup period and for providing at least a transfer pulse to said horizontal transfer CCD to remove electric charges in said transfer CCD just before reading of said electrical signal from said solid state image pickup element, said drive circuit being so arranged that it does not provider a transfer pulse to said horizontal transfer CCD during a period in such image pickup period except for a period when said transfer pulse is provided.

13. An electronic still camera according to claim 12, wherein a pulse applied to said horizontal transfer CCD before the electrical signal from said solid state image pickup element is read lies within the image pickup period, and wherein the frequency of said pulse within said image pickup period is less than the frequency in a read period.

14. An electronic still camera according to claim 12, wherein a pulse applied to said horizontal transfer CCD before the electrical signal from said solid state pickup element is read lies within the image pickup period, and wherein during a longer time than a follow-up time of said horizontal transfer CCD and said read drive circuit, said transfer pulse is applied.

15. An electronic still camera according to claim 12, wherein before reading from said solid state image pickup element, pulses are applied to said horizontal transfer CCD a larger number of times than the number of horizontal transfer stages.

16. An image pickup apparatus comprising:
  (a) image pickup means having a light receiving part for converting an optical image to an electrical signal and an output part for producing an output signal of the light receiving part;
  (b) trigger means for generating a trigger signal in response to a manually operable member; and
  (c) control means for clearing the electrical signal of said image pickup means in response to said trigger signal, said controlling means being arranged to read the output signal of said image pickup means a predetermined time after clearing the electrical signal of said image pickup means and to remove a residual signal in said output part to a drain means during said predetermined time period.

17. An image pickup apparatus according to claim 16, further comprising:
  recording means for recording the electrical signal generated by the image pickup means during said predetermined time period, as a still image signal.

18. An apparatus according to claim 16, wherein said output part includes an output amplifier for converting an electric charge signal formed by the light receiving part to a voltage signal.

19. An apparatus according to claim 16, wherein said output part includes a CCD transfer part.

20. An apparatus according to claim 16, further comprising clamping means connected to said output part for clamping the signal from the output part.

21. An apparatus according to claim 20, wherein said output part includes a CDS circuit.

22. An apparatus according to claim 16, wherein said control means performs removing continuously.

23. An apparatus according to claim 16, wherein said control means performs removing continuously.

24. An apparatus according to claim 16, wherein said control means performs the removing operation only just before said reading.

25. An apparatus according to claim 18, wherein said output part includes resetting means for resetting the voltage signal in the interior of said output amplifier.

26. An apparatus according to claim 25, wherein said control means performs removing by operating said resetting means.

27. An apparatus according to claim 16, wherein said image pickup means has a drain adjacent to the output part through a gate.

28. An apparatus according to claim 27, wherein said control means performs removing by controlling said gate.

* * * * *

UNITED STATES PATENT AND TRADEMARK OFFICE
CERTIFICATE OF CORRECTION

PATENT NO. : 4,914,518

DATED : April 3, 1990

INVENTOR(S) : Akira Suga

It is certified that error appears in the above-identified patent and that said Letters Patent is hereby corrected as shown below:

Col. 2, line 21, delete "so that"

Col. 2, line 33, delete "that" second occurrence and insert --the--.

Col. 2, line 67, change "is" to -- shows --

Col. 3, line 7, change "is" to -- shows --

Col. 3, line 9, change "is" to -- shows --

Col. 3, line 14, change "is' to -- shows --

Col. 3, line 44, change "set in." to -- set. --

Col. 3, line 60, change "by" to -- of --

Col. 4, line 1, change "is" to -- shows --

Col. 4, line 12, change "the" second occurrence to -- an --

Col. 4, line 20, change "consumption" to -- consumed --

Col. 4, line 26, change "consumption" to -- consumed --

Col. 4, line 35, change "consumption" to -- consumed --

Col. 4, line 37, change "consumption" to -- consumed --

Col. 4, line 50, change "is" to -- shows --

Col. 4, line 56, change "made" to -- set --

Col. 5, lines 4-5, change "consumption" to -- consumed --

Col. 5, line 17, change "consumption" to -- consumed --

Col. 5, line 41, change "The" to -- In the -- , insert -- , -- after "10" and delete "is that as this "

Col. 5, line 42, delete "explanation"

Col. 5, lines 44-45, change "consumption" to -- consumed --

Col. 5, line 60, change "made" to -- set to --

UNITED STATES PATENT AND TRADEMARK OFFICE
CERTIFICATE OF CORRECTION

PATENT NO. : 4,914,518

DATED : April 3, 1990

INVENTOR(S) : Akira Suga

It is certified that error appears in the above-identified patent and that said Letters Patent is hereby corrected as shown below:

Col. 6, line 35, change "made" to -- set to --

Signed and Sealed this

Thirtieth Day of June, 1992

Attest:

DOUGLAS B. COMER

*Attesting Officer*      *Acting Commissioner of Patents and Trademarks*